United States Patent

Bruggink

Patent Number: 5,263,252
Date of Patent: Nov. 23, 1993

[54] METHOD FOR MAKING A PANEL WITH CUTOUTS FORMED THEREIN

[75] Inventor: Bradley J. Bruggink, Oostburg, Wis.

[73] Assignee: Bemis Manufacturing Company, Sheboygan Falls, Wis.

[21] Appl. No.: 6,661

[22] Filed: Jan. 19, 1993

Related U.S. Application Data

[60] Division of Ser. No. 764,943, Sep. 24, 1991, Pat. No. 5,195,287, which is a continuation of Ser. No. 495,846, Mar. 19, 1990, abandoned.

[51] Int. Cl.⁵ .............................................. B23P 25/00
[52] U.S. Cl. ................................... 29/897.32; 83/861
[58] Field of Search .................. 29/897, 897.3, 897.32; 83/861, 701; 439/110, 111, 113, 120

[56] References Cited

U.S. PATENT DOCUMENTS

| | | |
|---|---|---|
| 347,682 | 8/1886 | Buckingham . |
| 2,137,536 | 11/1938 | McConnell . |
| 2,161,492 | 6/1939 | Wadsworth . |
| 2,267,610 | 12/1941 | Jore, Sr. ........................ 439/120 |
| 2,820,256 | 1/1958 | Dahl . |
| 3,389,517 | 6/1968 | Dunnington . |
| 3,408,250 | 10/1968 | Finefrock . |
| 3,548,552 | 7/1969 | McBride . |
| 3,808,760 | 5/1974 | Ward . |
| 4,017,137 | 4/1977 | Parks . |
| 4,277,123 | 7/1981 | Haworth et al. . |
| 4,467,572 | 8/1984 | Somers et al. . |
| 4,479,687 | 10/1984 | Humphreys et al. ............... 439/120 |
| 4,499,332 | 2/1985 | Shea et al. . |
| 4,730,432 | 3/1988 | Schafer et al. . |
| 4,760,072 | 8/1988 | Boundy et al. . |
| 4,769,199 | 9/1988 | Bemis et al. . |
| 4,845,908 | 7/1989 | Stohs . |
| 4,918,886 | 4/1990 | Benoit et al. . |
| 4,924,036 | 5/1990 | Shyu . |

FOREIGN PATENT DOCUMENTS

213080 3/1924 United Kingdom .

Primary Examiner—P. W. Echols
Assistant Examiner—David P. Bryant
Attorney, Agent, or Firm—Michael, Best & Friedrich

[57] ABSTRACT

A method of making a panel, the panel comprising a substantially rigid layer, and a flexible layer fixed to the rigid layer, the rigid layer having therethrough an endless cut dividing the rigid layer into a main portion and a cut-out portion, the flexible layer connecting the cut-out portion to the main portion and thereby holding the cut-out portion in place relative to the main portion.

9 Claims, 1 Drawing Sheet

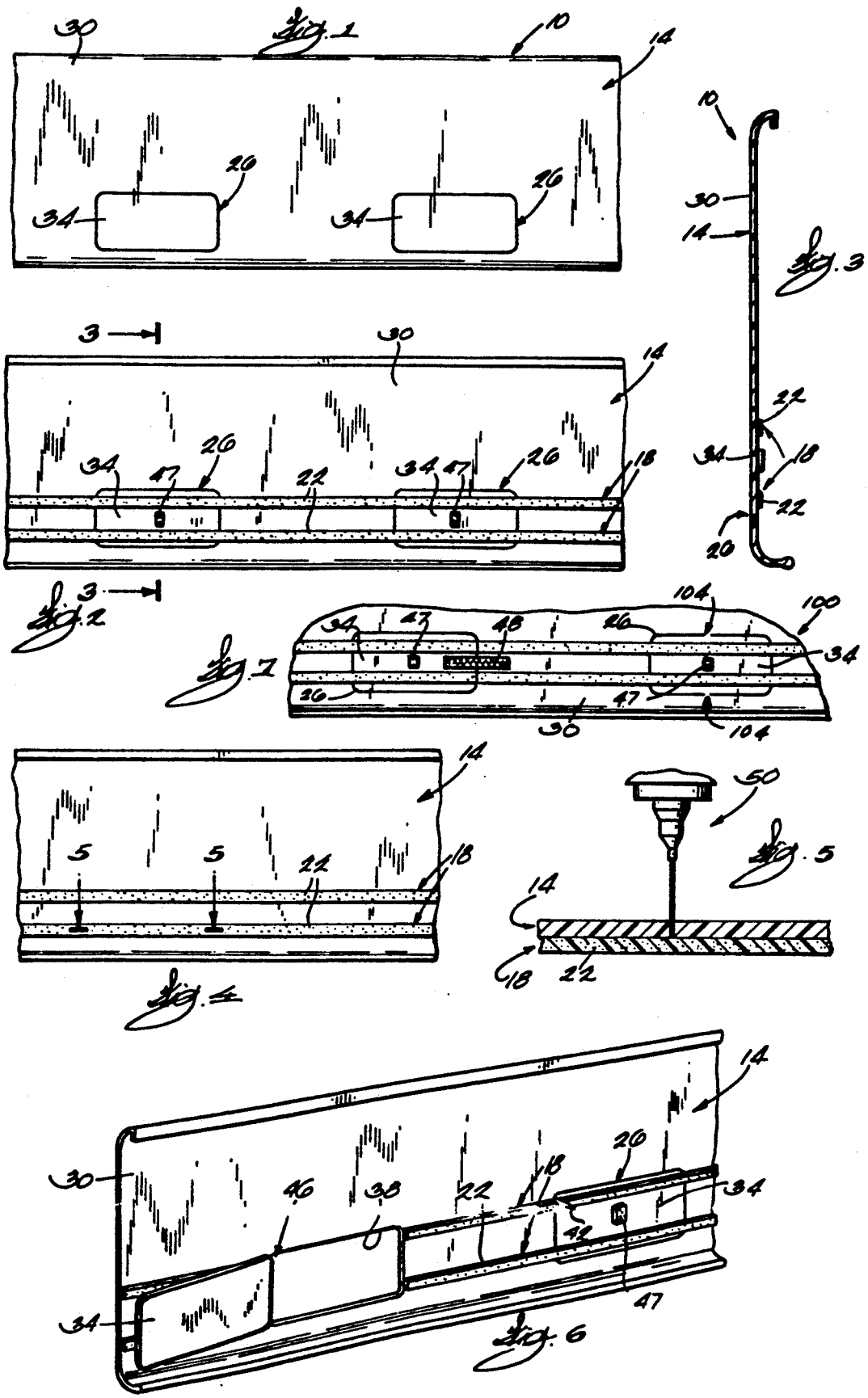

METHOD FOR MAKING A PANEL WITH CUTOUTS FORMED THEREIN

This is a division of co-pending application Ser. No. 764,943 filed Sept. 24, 1991, now U.S. Pat. No. 5,195,287, which is a continuation of application Ser. No. 495,846 filed Mar. 19, 1990, entitled "PANEL AND METHOD FOR MAKING THE SAME", now abandoned.

BACKGROUND OF THE INVENTION

The invention relates to panels having selectively removable cut-outs providing access to wiring behind the panels.

Conventional office panel systems include a portion or raceway holding wires such as electrical, computer and telephone wires. The raceway needs to have openings cut therein for appropriate receptacles so that calculators, phones, computers and the like can be hooked to the wires inside the raceway.

It is known to provide raceway panels with selectively removable cut-outs which when removed provide the necessary openings.

SUMMARY OF THE INVENTION

The invention provides a raceway panel including a hinged cut-out portion that can be pivoted out of place to provide an opening and that can be pivoted back into place to close the opening when the opening is no longer necessary.

More particularly, the invention provides an extruded panel comprising a layer of rigid PVC and a layer of flexible PVC. Preferably, the layer of flexible PVC is formed by a pair of generally parallel, spaced apart strips of flexible PVC extruded integrally with the layer of rigid PVC. The rigid PVC has therein an endless cut dividing the rigid PVC into a main portion and a cut-out portion, and the strips of flexible PVC connect the cut-out portion to the main portion and thereby hold the cut-out portion in place relative to the main portion. The cut-out portion preferably has a width substantially greater than the width of the flexible strips. The panel is extruded without the cut, and then a laser is used to provide the endless cut through the rigid PVC without cutting through the flexible PVC.

In order to provide an opening in the main portion of the rigid PVC, the flexible strips are cut at one end of the cut-out portion, in alignment with the cut in the rigid PVC, so that the flexible strips provide a hinge connection between the main portion and the cut-out portion at the opposite end of the cut-out portion. Thus, the cut-out portion can be pivoted to an open position to provide and opening in the main portion and can be pivoted back into place to close the opening when the opening is no longer required.

The panel also comprises means for securing the cut-out portion in its open position, and means for securing the cut-out portion in place after the cut-out portion is pivoted back to its closed position to close the opening.

Other features and advantages of the invention will become apparent to those skilled in the art upon review of the following detailed description, claims and drawings.

DESCRIPTION OF THE DRAWINGS

FIG. 1 is a front elevational view of a panel embodying the invention.

FIG. 2 is a rear elevational view of the panel.

FIG. 3 is a view taken along line 3—3 in FIG. 2.

FIG. 4 is a view similar to FIG. 2 showing the panel before it is cut.

FIG. 5 is a view taken along line 5—5 in FIG. 4 showing the panel being cut.

FIG. 6 is a perspective view of the back of the panel shown in FIGS. 1-3 showing the flexible strips being cut.

FIG. 7 is a partial rear elevational view of a panel that is an alternative embodiment of the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DESCRIPTION OF THE PREFERRED EMBODIMENT

A panel 10 embodying the invention is illustrated in FIGS. 1-6. As best shown in FIG. 3, the panel 10 comprises a substantially rigid layer 14 and a flexible layer 18 fixed to the rear of the rigid layer 14. While various suitable materials can be employed, in the preferred embodiment, the rigid layer 14 is fabricated of rigid PVC and the flexible layer 18 is fabricated of flexible PVC. Furthermore, in the preferred embodiment, the flexible layer 18 includes a pair of generally parallel, spaced apart strips 22 of flexible PVC. The rigid layer 14 and the flexible strips 22 have substantially equal thicknesses, as shown in FIG. 5.

The rigid layer 14 has therein (see FIGS. 1-3) two endless cuts 26 dividing the rigid layer into a main portion 30 and two cut-out portions 34. The cuts 26 do not pass through the flexible strips 22. In the illustrated construction, each endless cut 26 defines a rectangle so that the cut-out portions 34 are rectangular. As shown in FIG. 2, the top of each cut-out portion 34 is located above the upper strip 22, and the bottom of each cut-out portion 34 is located below the lower strip 22. Thus, each cut-out portion 34 has a width or height that is substantially greater than the width of either of the strips 22. Because the cuts 26 do not pass through the strips 22, the strips 22 connect the cut-out portions 34 to the main portion 30 and thereby hold the cut-out portions 34 in place, or in a closed position, relative to the main portion 30.

If an opening 38 (FIG. 6) is desired in the main portion 30 of the rigid layer 14, the strips 22 are cut in alignment with the cut 26 in the rigid layer 14 at one end of a cut-out portion 34. The flexible strips 22 can be cut by any suitable means, such as a sharp knife 42 (FIG. 6). As a result, the strips 22 provide a hinge 46 at the opposite end of the cut-out portion 34, and the cut-out portion 34 can be pivoted to an open position (shown on the left in FIG. 6) providing an opening 38 in the main portion 30 of the rigid layer 14.

The panel 10 further comprises mean for securing the cut-out portion 34 in its open position. While various suitable means can be used, in the illustrated construction, such means includes a piece of two-sided "MYLAR"-backed adhesive tape 47 fixed to the rear of the cut-out portion 34 between the strips 22. When the cut-out portion 34 is pivoted to its open position, the tape 47 adheres to the rear of the main portion 30 of the rigid layer 14 and releasably secures the cut-out portion 34 in its open position.

If an opening in the rigid layer 14 is thereafter no longer desired, the cut-out portion 34 can be pivoted back to its closed position. Accordingly, the panel 10 also comprises means for resecuring the cut-out portion 34 in place or in its closed position after the strips 22 have been cut. While various suitable resecuring means can be employed, in the illustrated construction, such means includes (see FIG. 7) a piece of reinforced tape 48 extending across the cut 26 and securing the cut-out portion 34 to the main portion 30.

The panel 10 is preferably extruded as a single extrusion including the rigid layer 14 and the flexible strips 22. The endless cuts 26 are preferably provided with a laser 50, as shown schematically in FIG. 5. A laser is convenient because it can be programmed so that it only cuts through the rigid layer 14 and does not cut through the flexible strips 22. It should be noted, however, that no harm is done by cutting partially through the flexible strips 22, so long as enough of the strips 22 remain uncut to provide the necessary hinge. A laser is also advantageous because it provides a cut having a substantially lesser thickness than a cut provided by a conventional cutting tool. (A conventional cutting tool leaves a gap of 0.100 inch, whereas a laser leaves a gap of only 0.008 inch.) Furthermore, a laser is advantageous because it can be easily reprogrammed to vary the shape of the cut-out portion 34. This is much simpler than providing and repositioning a new die for a conventional punch press.

Because the cut-out portion 34 is reused to close the opening 38, it is not necessary to match the color of an injection molded part to close the opening. Reusing the cut-out portion 34 also eliminates the cost of injection molding a new part.

A panel 100 that is an alternative embodiment of the invention is illustrated in FIG. 7. Except as described hereinafter, the panel 100 is substantially identical to the panel 10, and common elements have been given the same reference numerals.

In the panel 100, the endless cut 26 includes two portions that pass partially through the rigid layer 14 so as to provide a pair of knock-out tabs 104 connecting the cut-out portion 34 to the main portion 30. Preferably, these portions of the cut pass through approximately 75% of the rigid layer 14. (In the panel 10, the entire cut 26 passes completely through the rigid layer 14.) The knock-out tabs 104 must be cut prior to pivoting the cut-out portion 34 to its open position. The endless cut 26 of the panel 100 is preferably provided by a laser, which can be programmed to provide the knock-out tabs 104.

Various features of the invention are set forth in the following claims.

I claim:

1. A method for producing a panel, said method comprising the steps of
   providing a panel comprising a substantially rigid layer and a flexible layer fixed to said rigid layer, and
   cutting through said rigid layer to provide therein an endless cut dividing said rigid layer into a main portion and a cut-out portion with said flexible layer connecting said cut-out portion to said main portion and thereby holding said cut-out portion stationary relative to said main portion.

2. A method as set forth in claim 1 wherein said providing step includes the step of extruding said rigid layer and said flexible layer as a single extrusion.

3. A method as set forth in claim 1 wherein said providing step includes the step of extruding in a single extrusion said rigid layer and a strip of flexible material defining said flexible layer.

4. A method as set forth in claim 1 wherein said cutting step includes the step of using a laser to provide said endless cut.

5. A method as set forth in claim 1 and further comprising the step of cutting completely through a portion of said flexible layer aligned with a portion of said endless cut so that said flexible layer provides a hinge between said main portion and said cut-out portion.

6. A method as set forth in claim 1 wherein said cutting step includes the step of cutting completely through only said rigid layer to provide therethrough said endless cut.

7. A method as set forth in claim 1 wherein said cutting step includes the step of cutting said rigid layer so that said endless cut includes a portion passing partially through said rigid layer so as to provide a knock-out tab connecting said cut-out portion to said main portion.

8. A method for producing a panel having therein an opening, said method comprising the steps of
   providing a panel comprising a substantially rigid layer having therein an endless cut dividing said rigid layer into a main portion and a cut-out portion, and a flexible layer fixed to said rigid layer, said flexible layer connecting said cut-out portion to said main portion and thereby holding said cut-out portion stationary relative to said main portion,
   cutting completely through a portion of said flexible layer aligned with a portion of said endless cut so that said flexible layer provides a hinge between said main portion and said cut-out portion, and
   pivoting said cut-out portion relative to said main portion to provide an opening in said main portion.

9. A method as set forth in claim 8 wherein said endless cut includes a portion passing partially through said rigid layer so as to provide a knock-out tab connecting said cut-out portion to said main portion, and wherein said method further comprises the step of cutting through said tab prior to said pivoting step.

* * * * *

UNITED STATES PATENT AND TRADEMARK OFFICE
CERTIFICATE OF CORRECTION

PATENT NO. : 5,263,252
DATED : November 23, 1993
INVENTOR(S) : BRADLEY J. BRUGGINK It is certified that error appears in the above-indentified patent and that said Letters Patent is hereby corrected as shown below:

Title page,

At [73] Assignee, change "Bemis Manufacturing Company, Sheboygan Falls, Wis." to --Westinghouse Electric Corporation, Pittsburgh, Pa.--

Signed and Sealed this

Fourteenth Day of January, 1997

Attest:

BRUCE LEHMAN

Attesting Officer

Commissioner of Patents and Trademarks